(12) United States Patent
Medhin et al.

(10) Patent No.: US 11,712,698 B2
(45) Date of Patent: Aug. 1, 2023

(54) SYSTEM AND METHOD FOR DRYING AND MILLING SPENT GRAIN INTO FLOUR

(71) Applicant: Backcountry Mills, LLC, Boerne, TX (US)

(72) Inventors: Yonatan Medhin, San Antonio, TX (US); Matthew Mechtly, San Antonio, TX (US)

(73) Assignee: Backcountry Mills, LLC, San Antonio, TX (US)

( * ) Notice: Subject to any disclaimer, the term of this patent is extended or adjusted under 35 U.S.C. 154(b) by 422 days.

(21) Appl. No.: 16/910,164

(22) Filed: Jun. 24, 2020

(65) Prior Publication Data

US 2021/0001345 A1 Jan. 7, 2021

Related U.S. Application Data

(60) Provisional application No. 62/869,298, filed on Jul. 1, 2019.

(51) Int. Cl.
| | |
|---|---|
| *B02B 1/08* | (2006.01) |
| *B02C 9/04* | (2006.01) |
| *B02C 9/02* | (2006.01) |
| *B02B 5/02* | (2006.01) |
| *B02C 19/18* | (2006.01) |
| *B02C 23/14* | (2006.01) |
| *B02C 23/18* | (2006.01) |

(Continued)

(52) U.S. Cl.
CPC ............... *B02B 1/08* (2013.01); *B02B 5/02* (2013.01); *B02C 9/02* (2013.01); *B02C 9/04* (2013.01); *C12F 3/00* (2013.01); *B02C 19/186* (2013.01); *B02C 19/22* (2013.01); *B02C 23/14* (2013.01); *B02C 23/18* (2013.01)

(58) Field of Classification Search
CPC .................................... B02C 9/02; B02C 9/04
USPC ........................................................... 241/23
See application file for complete search history.

(56) References Cited

U.S. PATENT DOCUMENTS

| | | |
|---|---|---|
| 3,946,120 A | 3/1976 | Vincent et al. |
| 8,535,907 B2 | 9/2013 | Tang |
| 9,314,032 B2 | 4/2016 | Bernacchi |

(Continued)

FOREIGN PATENT DOCUMENTS

WO 2018014020 A1 1/2018

*Primary Examiner* — Shelley M Self
*Assistant Examiner* — Smith Oberto Bapthelus
(74) *Attorney, Agent, or Firm* — William H. Quirk; Alexander J. Antonio; Rosenthal Pauerstein Sandoloski Agather, LLP

(57) ABSTRACT

A process for converting spent grain into flour by drying and milling is disclosed. The process includes the steps of introducing a quantity of wet spent grain into a container for removing moisture by the action of gravity. After the gravity drying, the wet spent grain is transferred to a press to mechanically remove additional moisture. The wet spent grain is placed in a fluid bed processor where the grain additional moisture is removed through heating and fluidization. Some embodiments may include a dust collection system in connection with the fluid bed processor, wherein the dust collection system incorporates a separator for separating the grains. Once dried, the dry spent grain is introduced into a mill to be ground into the proper flour consistency. The resulting flour product can then be used for a variety of foodstuff applications.

9 Claims, 9 Drawing Sheets

(51) Int. Cl.
 *B02C 19/22* (2006.01)
 *C12F 3/00* (2006.01)

(56) References Cited

U.S. PATENT DOCUMENTS

| | | |
|---|---|---|
| 10,104,897 B2 * | 10/2018 | Brown ................. A21D 10/025 |
| 10,194,669 B2 | 2/2019 | Johns |
| 2019/0200641 A1 | 7/2019 | Wooton et al. |
| 2019/0246591 A1 | 8/2019 | Leo |

* cited by examiner

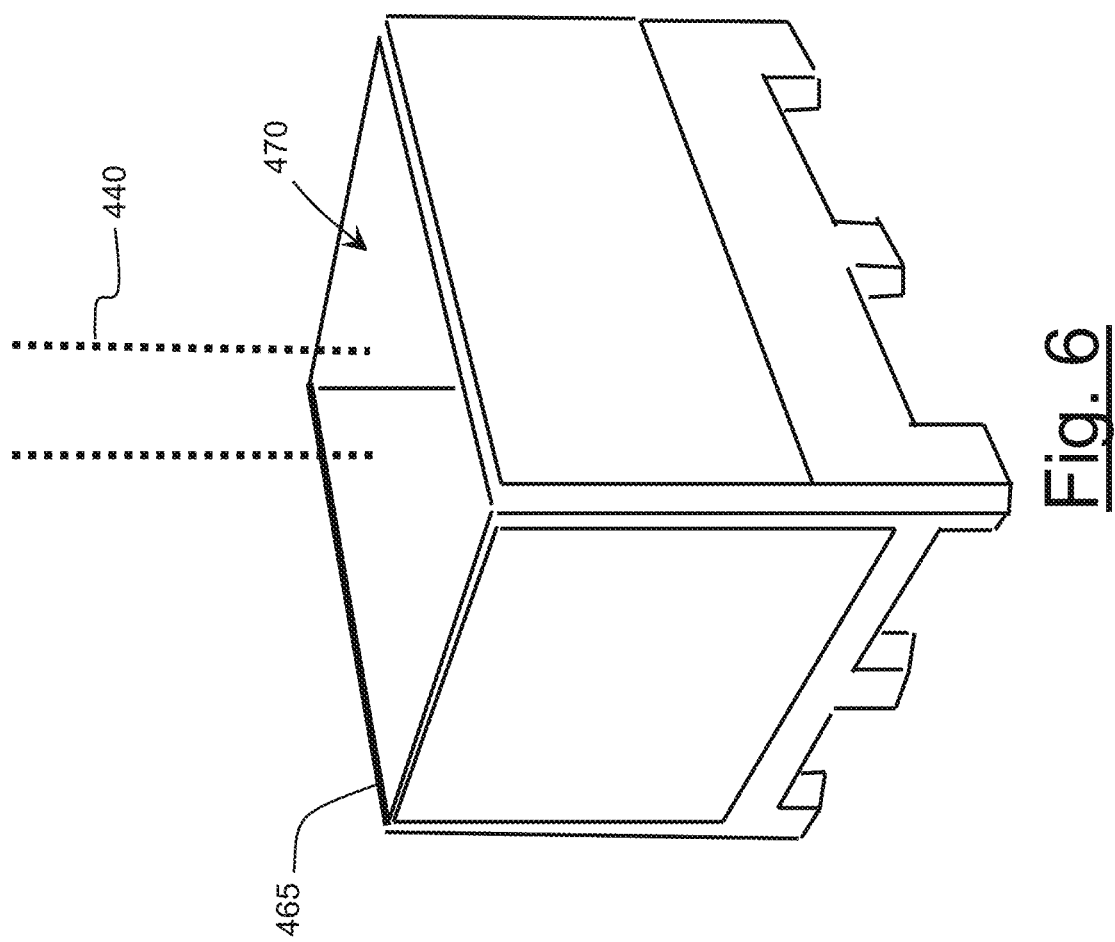

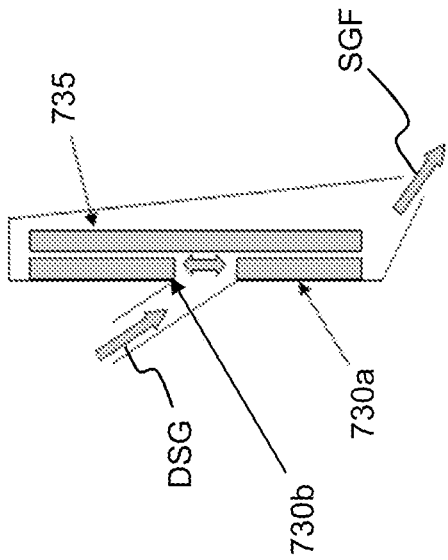
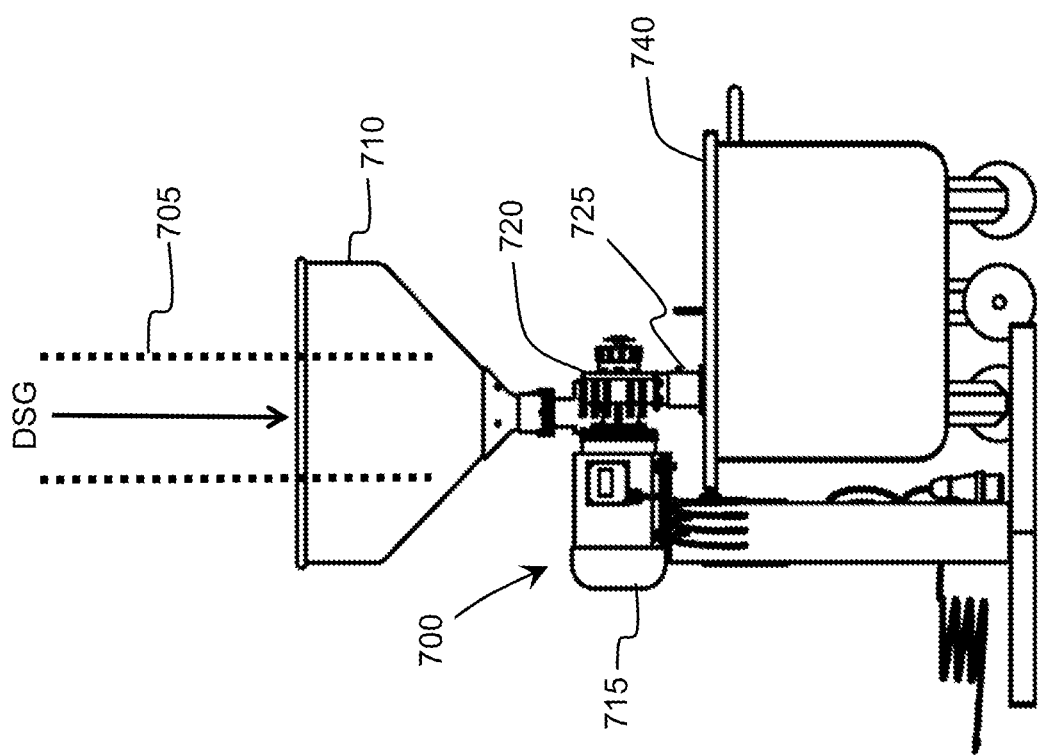

SYSTEM AND METHOD FOR DRYING AND MILLING SPENT GRAIN INTO FLOUR

CLAIM OF PRIORITY TO PRIOR APPLICATION

This application claims the benefit of the filing date of U.S. Provisional Application, Ser. No. 62/869,298, filed on Jul. 1, 2019, entitled "System and Method for Drying and Milling Spent Grain into Flour." The entire disclosure, including the claims and drawings, of U.S. Provisional Application, Ser. No. 62/869,298, is hereby incorporated by reference into the present disclosure in its entirety.

FIELD OF THE INVENTION

The present invention relates to production of foodstuffs, and more particularly a system for drying and milling spent grain and method for creating a spent grain flour product.

BACKGROUND

The global brewing industry consists of thousands of producers. In the U.S. alone, according to some estimates, more than 202 million barrels of beer are shipped with industry revenue exceeding $119 billion each year. The process of brewing has largely been the same for thousands of years and involves converting the primary ingredients of water and grain into beer. A variety of grains are used in the brewing process, such as wheat, barley, rye, oat, and maize, among others. Starches from the grains are broken down into sugars using certain enzymes. These sugars are then introduced to yeast, which aids in turning these extracted sugars into alcohol through a fermentation process. After the brewing process has extracted most of the starches—spent grains, the leftover malt, and other adjuncts consisting of sugars, fiber, proteins, and other nutrients—can constitute as much as 85% of a brewery's total byproduct.

Wet Spent Grain (WSG) (also known as Brewer's Spent Grain or Distiller's Spent Grain) is the main byproduct from the brewing and distilling industries. In order to get the starches—and ultimately alcohol—needed for brewers/distillers to make their final products, grains are used as the primary source material. The largest portion of the blend—typically 80% or more—is barley. The rest is typically composed of oat, wheat, or corn, depending on the ultimate product made from the brewing process.

Once the brewer/distiller has removed the desired starches from the grain—during part of the brewing/distilling process known as mashing—the WSG is usually disposed of or used as a supplemental livestock feed. Thus, breweries of all sizes are left with the issue of either disposing of somehow using the spent grain by-product. There are limited uses for the spent grain, and it is primarily either deposited into a landfill or given to farmers to be used as feed substitute. WSG, however, still retains much of its useful nutritional content of protein and fiber following the mashing process. Unfortunately, this nutritive content remains largely inaccessible due to the high moisture content of the WSG. Without modification, spent grain is fairly useless as an ingredient for foodstuff because of its high moisture content, generally greater than 70%, causing it to be highly volatile with high risk for spoilage within 24-48 hours. If the WSG is dried within this short time frame before it spoils, it becomes shelf stable and can be converted into Dry Spent Grain (DSG). The sharp and gritty texture of dried spent grain also proves problematic for foodstuff applications. Even after the DSG is dried to a stable moisture level below 9% water content, the DSG retains its sharp, point shape, which has a disagreeable mouthfeel when consumed by humans. Therefore, after removing the moisture through the drying process, the DSG must be further processed into Spent Grain Flour (SGF) in order to be made into a form more desirable for safe consumption by humans.

Breweries are constantly searching for creative ways to turn the waste product of spent grain into a profitable portion of their business. In addition to simply providing the spent grain for agricultural purposes or throwing it away, breweries could expand the number of consumers for the byproduct by turning it into a stable and transportable form of flour. There is a need for a process to quickly and efficiently reduce spent grain into a more useful flour form for foodstuff applications.

BRIEF SUMMARY OF THE INVENTION

A principal object of the present disclosure is to provide a system and method for drying wet spent grain resulting in dry spent grain and then milling the dry spent grain into spent grain flour. Disclosed embodiments preferably include a system that involves the use of a device for removing moisture from the spent grain by action of gravity, a mechanical press for removing additional moisture, a fluid bed processor or dryer for removing still additional moisture, and a mill for transforming the dry spent grain into flour.

In order to produce flour for a variety of foodstuff applications from spent grain, a volume of moisture must be removed from the spent grain. One step in the process includes placing the spent grain, from a brewer's mash tun, into a food-safe container configured to hold a quantity of spent grain while enabling moisture removal through gravity action. The container preferably includes a mesh screen or false bottom onto which the spent grain is placed. Over time, moisture seeps from the spent grain into the bottom of the container where this moisture may be drained.

In addition to gravity drainage, another preferred step in the process involves mechanical moisture removal. For this step, a press may be implemented, wherein the spent grain is removed from the container used for gravity drainage, and the spent grain is loaded into a mechanical press. The mechanical press acts to (look up press) compress the quantity of spent grain against a surface to extract additional moisture from the spent grain.

The fluid bed processor or dryer device removes moisture in a timely manner by circulating heated air heated through the spent grain which is loaded on to a slotted plate within the fluid bed dryer. The air is heated by coils incorporated in the fluid bed dryer. Agitators associated with the fluid bed dryer device are used to shake the grain to combat the spent grains' tendency to bundle or cluster up. While air is circulating in the fluid bed dryer device, a dust collecting system within the device preferably enables the spent grain to remain levitated within the housing and maintain optimal conditions for fast drying. Grain is dried in the fluid bed dryer until moisture content is reduced, preferably to less than 5%.

One disclosed embodiment includes a method of milling the dried spent grain with a milling device. In preferred embodiments, the milling device is a disc mill or grinding mill. A disc mill employs one or more rotating and/or stationary discs, wherein the material deposited in the disc mill is crushed or ground using one or more discs. In alternative embodiments, an impact mill may be used to mill the dry spent grain into spent grain flour. The impact mill, also known as a rock crusher, or hammer mill, is used to reduce the dried spent grain that is introduced to flour of a desired consistency. The impact mill device will crush a variety of grain size to the same consistency which is appropriate for all forms of baking and cooking.

The disclosure, including descriptions, drawings, and claims, describes one or more embodiments. Many other features, objects, and advantages will be apparent to one of ordinary skill in the art from the disclosure. Given the disclosure, especially in light of the prior art, it is another object to improve upon, and overcome the inefficiencies, limitations, and constraints of, the prior art.

BRIEF DESCRIPTION OF THE DRAWINGS

FIG. 6 is an isometric view of a food-safe container for holding and transporting wet spent grain during the drying process.

FIGS. 7A & 7B are various representations of a mill and its associated features for milling the dry spent grain into spent grain flour.

DETAILED DESCRIPTION OF PREFERRED EMBODIMENTS

The disclosures of this patent application, including the descriptions, drawings, and claims, describe one or more embodiments of the invention in more detail. Many other features, objects, and advantages will be apparent from these disclosures to one of ordinary skill in the art, especially when considered in light of a more exhaustive understanding of the numerous difficulties and challenges faced by the art. While there are many alternative variations, modifications and substitutions within the scope of the disclosed embodiments, one of ordinary skill in the art should consider the scope of any disclosed embodiments from a review of any claims that may be appended to applications and patents based hereon, including any amendments made to those claims in the course of prosecuting this and related applications.

Figure 1:
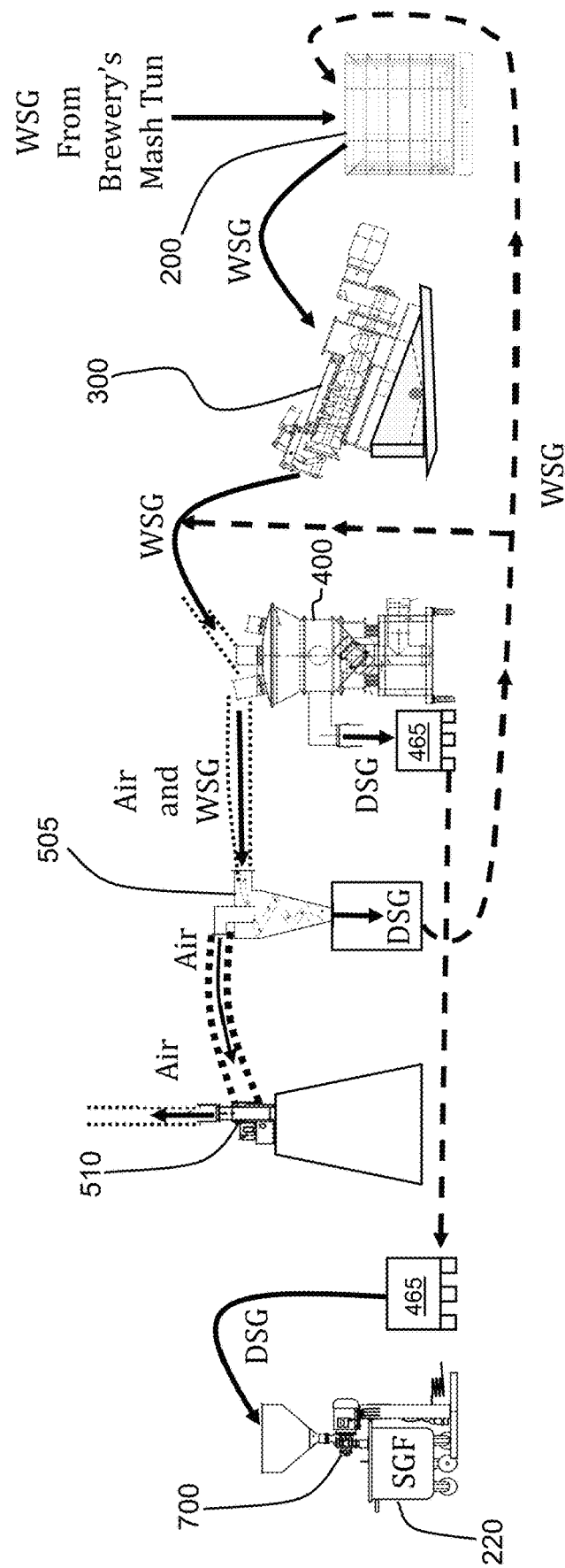
FIG. 1 is a schematic representation of the components of the process for creating spent grain flour from wet spent grain.

Turning first to FIG. 1, there is shown a schematic representation of the process and components involved in transforming wet spent grain (WSG) into spent grain flour (SGF) that is intended for human consumption. Each of these steps in the process, as well as the individual components involved, will be explained in greater detail with respect to the other drawing figures. At the outset, it should be understood that the entire spent grain byproduct, including both the resulting grain germ and the grain coverings, is used in the systems and methods herein described. Accordingly, by implication, the resulting spent grain flour should contain at least 50% fiber by weight.

The sequence of the method is illustrated from right to left in FIG. 1. Starting at the far right of the schematic, WSG is obtained from a brewery's mash tun. This WSG is deposited into a food-safe container 200 having a false bottom or screen 205 (shown in FIG. 2) and a drain 210 near the base of the container 200 that allows for gravity-induced moisture removal from the WSG.

Figure 3:
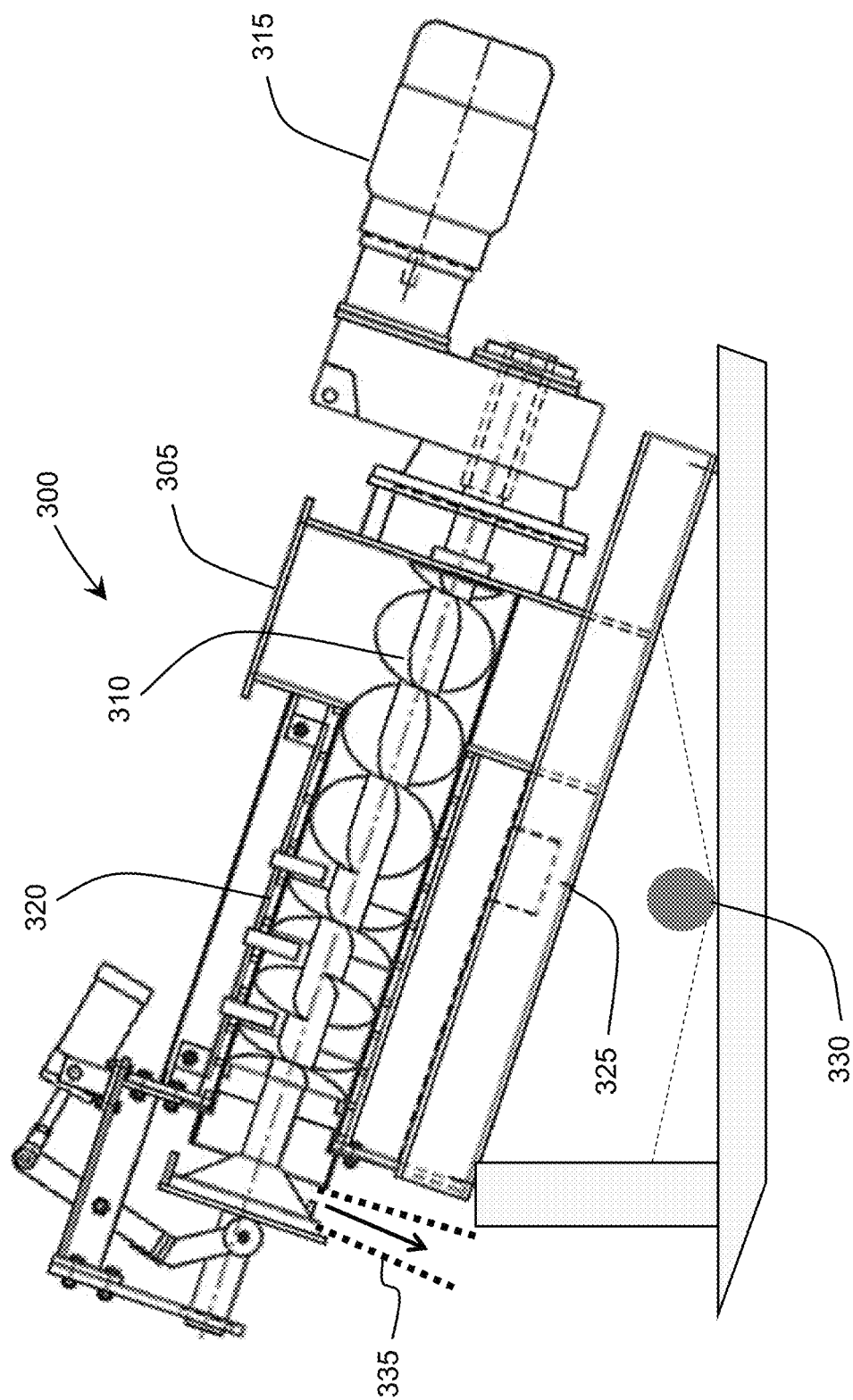
FIG. 3 is a side view of a screw press for removing moisture from the wet spent grain.

Following the first step of gravity drainage in the food-safe container 200, the partially dried WSG is then transferred to a press 300 for further mechanical moisture removal from the WSG. The WSG is pushed by the press 300 against a grating 310 (as shown in FIG. 3), and the moisture removed from the WSG exits the press 300 through a drain 320.

After the pressing step in the process, the WSG is then transferred to a fluid bed processor or dryer 400 where the partially dried WSG is subject to heating and is fluidized to assist in removing additional moisture from the WSG. As will be described in further detail below, the fluid bed dryer 400 is preferably connected to, and in fluid communication with, a dust collector 500 that is itself connected to a separator 510. The dust collector 500 collects some fluidized particles of grain from the fluid bed dryer 400, and the separator 510 then separates these fluidized particles of grain which are collected in the dust collector 500.

After the WSG is adequately dried such that the grain is referred to as Dry Spent Grain (DSG), the DSG is transferred to a food-safe cooling container 465 in order to cool the DSG after heating in the fluid bed dryer 400. Once the DSG is adequately cooled, the DSG is then transferred to a mill 700 for milling the DSG into Spent Grain Flour (SGF) that is palatable and ready for human consumption.

Gravity Drainage

Immediately following the mashing process, the WSG has a moisture content of approximately 85% (See Table 1 for a reference to all water/grain weight and percentages during the process described herein). The more time allowed for drainage in the mash tun (the piece of equipment used in the brewing process that initially holds the WSG), the lower that moisture content of the grain when removed at the beginning of the process herein described. When the WSG is ultimately removed from the mash tun, the moisture content is typically between 76% to 85%, with an average moisture content of 80%. However, due to the importance of the mash tun to the brewing process, there is typically a limited amount of time that the WSG can spend draining within the mash tun before another batch needs to be processed. In other words, more water can be further removed through drainage if the WSG is placed in a particular type of vessel that is suited for further drainage.

TABLE 1

Average water content of the Wet Spent Grain, Dry Spent Grain, and Spent Grain Flour between stages of the Process

| | Average Weight of Barley and Other Spent Grains (lbs) | Average Weight of Water (lbs) | Average Total Weight (lbs) | Average % of Mixture that is Water | Average Water Weight removed during Previous Step (lbs) | Average % of Total Water Removed During Previous Step |
|---|---|---|---|---|---|---|
| Immediately after Mashing Process | 280 | 1596 | 1876 | 85.07% | NA | NA |
| Before Gravity Drainage/After Removal from Mashing Tun following preliminary drainage | 280 | 1120 | 1400 | 80.00% | 476 | 25.37% |
| After Gravity Drainage Step | 280 | 882 | 1162 | 75.90% | 238 | 12.69% |
| After Pressing | 280 | 658 | 938 | 70.15% | 224 | 11.94% |
| After Drying | 280 | 15 | 295 | 5.21% | 643 | 34.25% |
| After Milling/Final State | 280 | 15 | 295 | 5.21% | 0 | 0.00% |

Figure 2:
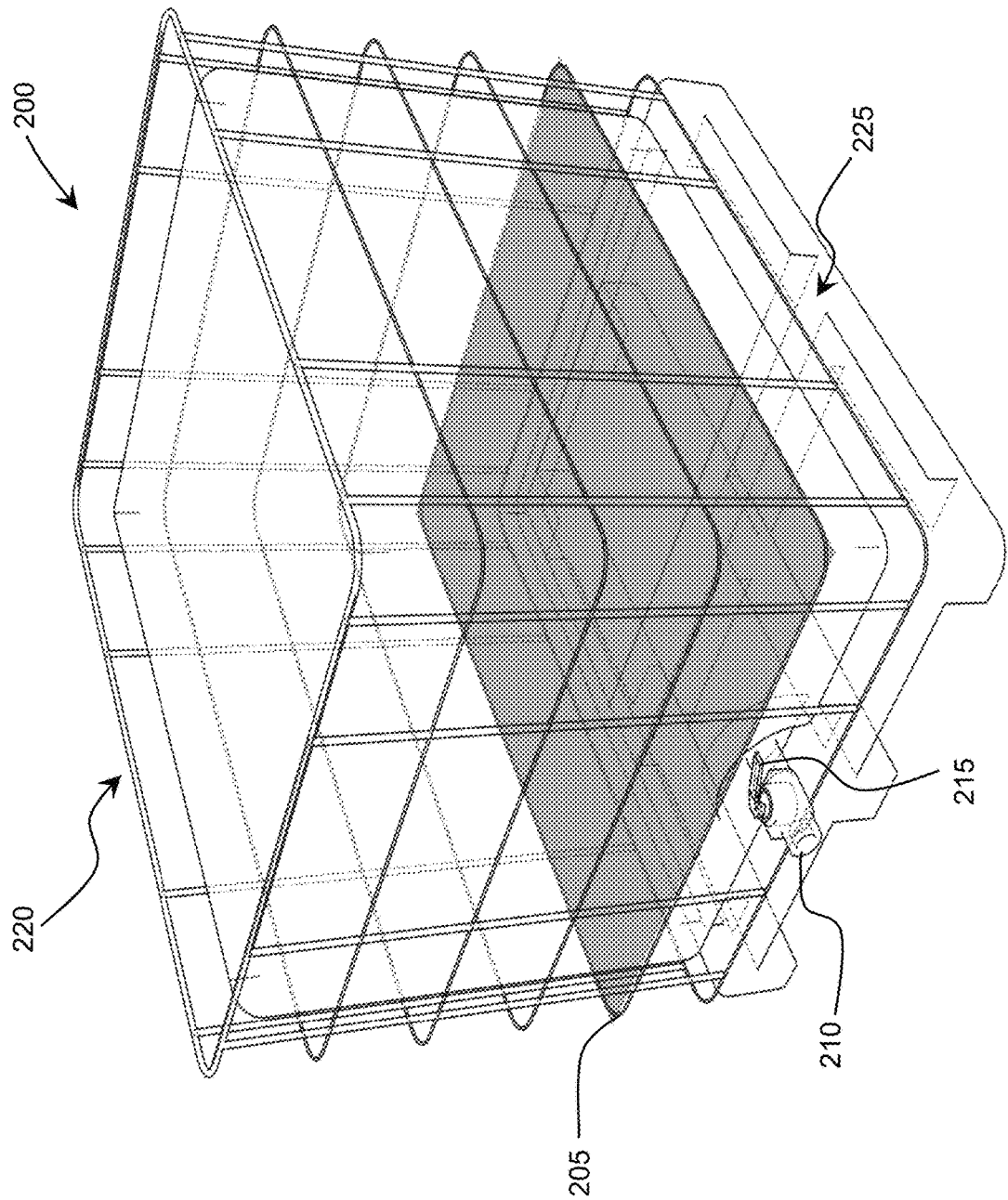
FIG. 2 is an isometric view of a containment vessel to be used for gravity drainage of moisture during the drying process.

Turning now to FIG. 2, there is shown a food-safe gravity-drainage container 200 into which WSG from the brewery mash tun is placed. Drainage container 200 is configured to allow drainage of some moisture from the WSG by the action of gravity. Once the WSG is removed from the mash tun, there is still residual free water that can be removed by employing gravity drainage, with the proper type of containment vessel represented by container 200. This is the most energy-efficient form of moisture reduction, particularly because no external power or energy input is required. However, the extent of drying that can be achieved with this method is limited. In one non-limiting example, over the course of three hours, it was observed that the moisture of the WSG can be further reduced from an average of around 80% down to an average near 76%. This percentage reduction of moisture in the WSG may be accomplished in a shorter or longer period of time depending on ambient conditions.

Container 200 has an opening 220 at the top of container 200 for accepting the WSG from the mash tun. Once placed in container 200, the WSG sits on top of a false bottom or screen 205. Screen 205 has a grating/mesh size that is smaller than that of the particles of WSG such that the WSG does not pass through screen 205 when the WSG is placed thereon. However, screen 205 allows moisture from the WSG to pass through the grating to the bottom of container 200. This results in reduction in the amount of water and/or moisture in the WSG. In one particular non-limiting example, during testing, this reduction in water occurred in containers filled with 1,400 pounds of grain, filling a container of approximately 3.5 feet in height and a cross-sectional area of 13 square feet. Therefore, on average, the free water within the WSG flows due to gravity drainage at a speed of 1.2 feet/hour. This gravity-induced flow is defined by Darcy's Law:

$$Q = \frac{kA}{\mu L}\Delta p$$

Where Q=flowrate (cubic meters per second [m³/s]);
k=permeability (Darcys [D]);
A=cross-sectional area (cubic meters [m³]);
Mu=viscosity (Pascal-second [Pa*s]);
Delta p=change in pressure (Pascals [Pa])
L=length of path of fluid (meters [m])

The permeability is estimated from several tests while gravity-draining the WSG. During the 3-hour period, an average of 24 gallons (US) emerged from the WSG. With a cross-sectional area of 1.21 square meters, a dynamic viscosity of roughly 0.85 Centipoise (cP), a length of 0.5 meters, and a pressure differential due to gravity of 17,000 Pascals, the permeability of the WSG was estimated to be 190 millidarcys (mD). This is an important calculation, because depending on the amount of grain and dimensions of the container 200 holding the grain, the amount of time needed to complete the gravity drainage step will change.

Container 200 also includes a drain 210 having a spigot 215. Drain 210 is shown mounted below screen 205 near the base of container 200. Drain 210 is in fluidic contact with an open space 225 below screen 205 where moisture draining from the WSG collects. The screen 205 and/or base drain 210 is necessary to actually extract the free water from the WSG-filled container 200; otherwise, the water will simply pool up at the bottom of the container 200 and increase the moisture of the WSG in the bottom of the container 200.

Mechanical Moisture Removal

In addition to gravity drainage of moisture in the WSG, mechanical removal of moisture is performed for removing a much greater volume of moisture. Turning to FIG. 3, there is shown a mechanical press 300. In preferred embodiments, the mechanical press is a dewatering screw press (DSP) 300. Following the gravity drainage step, DSP 300 is utilized to further decrease the moisture of the WSG. This step, on average, decreases the average moisture of the WSG from 76% (following the gravity drainage step) to 66%. While the gravity drainage step could be skipped entirely and the WSG placed directly into the DSP 300, doing so yields a moisture level of 70% on average. While a 4% difference in average moisture content may not seem substantial, this is immensely important due to the thermodynamic limitations of the next step of the drying process and the importance of achieving a competitive, economical, energy-efficient drying process as a whole.

For this next dewatering or moisture-removing step, the WSG is loaded from container 200 in the previous step and placed into DSP 300 through inlet 305. DSP 300 utilizes an Archimedes screw 310 that is driven by motor 315. More particularly, motor 315 drives rotation of Archimedes screw 310 which compresses the WSG between Archimedes screw 310 and a narrow grating 320. The narrow grating 320 has small perforations that allow water or moisture to pass through, but the perforations are small enough to prevent passage of individual grains that make up the WSG. Pressing of the WSG is preferably accomplished through continuous operation of DSP 300 such that the WSG is pushed along through the interior of DSP 300 while the moisture is removed from DSP 300, with the moisture exiting the main body of DSP 300 via a drain 325 positioned on an underside of DSP 300. The moisture that is removed from the WSG is eventually discharged from DSP 300 through plumbing outlet 330. Once this pressing step is complete, the WSG is discharged from DSP 300 through WSG outlet 335 to the next stage in the process. While not as energy efficient at removing water as gravity drainage, the pressing step is more energy efficient than thermally drying the WSG, as explained in the next step in the process.

Thermal Drying and Fluidization

Figure 4:
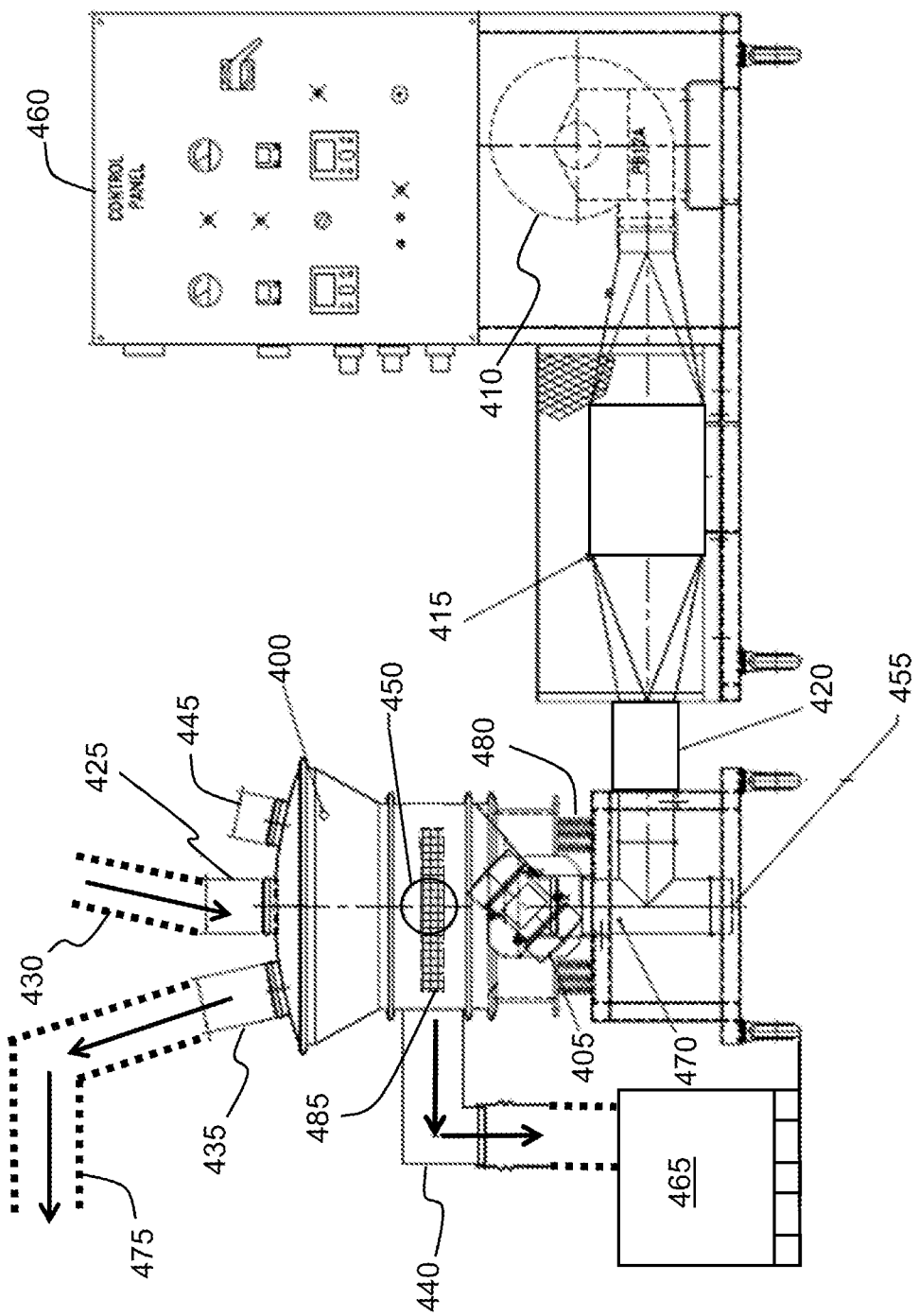
FIG. 4 is a plan view of a fluid bed processor used in the drying process.

The next moisture-removal step in the process utilizes a thermal air-drying apparatus 400, preferably a fluid bed processor 400 as illustrated in FIG. 4. The WSG is placed into an enclosed, circular fluid bed processor 400 until the bed of the WSG is preferably 4-5 inches in depth within the fluid bed processor 400. In order to allow the grain to be efficiently dried, the fluid bed processor 400 includes one or more vibrating/undulating mechanisms. Ideally, the gas flow rate should be high enough for the spent grain to levitate or "fluidize." However, due to the spent grain's tendency to bundle or cluster up, the agitators are used to shake the grain apart in order to allow the heated air to efficiently circulate and to allow the spent grain to fluidize. The vibrational components, namely vibrators 405, are turned on to assist with fluidizing the WSG. Although only one vibrator 405 is visible in FIG. 4, it should be understood that another vibrator 405 is similarly positioned on the opposite side of fluid bed processor 400. The fluid bed processor or dryer 400 must have two oppositely positioned vibrator components 405 to better fluidize the WSG. The vibrational component of this drying step is necessary due to the cohesive nature of WSG. If no vibration takes place while circulating heated air through the grain, the bottom layer of WSG can be burned, which disrupts the pleasant taste of the final product. Additionally, without the vibrators 405, high permeability pathways can occur in the WSG, thereby lowering the efficiency of the heat transfer resulting in inefficient moisture removal. The high permeability pathways can occur when a fluid passing through a porous medium discovers/creates a particularly high permeability ("easy flow") pathway, thereby preventing the heated air (fluid) from passing through and drying all parts of the WSG. Therefore, any high permeability pathways are counterproductive to the goal of drying all the WSG. Vibrating the fluid bed processor 400 prevents these high permeability pathways by "fluidizing" the WSG in combination with the air inlet fan 410.

After the WSG is placed on screen 485 in the vibrating fluid bed processor 400, a heating element 415 is turned on and heated to a temperature between 300° F. and 350° F. This heating element 415 is preferably connected to, and is in fluid communication with, the fluid bed processor 400 through a conduit 420. Conduit 420 may be a flexible or rigid conduit. With the heating element 415 heated to the target temperature, air can be pushed through the heating element 415, through conduit 420 into air inlet 470 and finally up through the grating of screen 485 in the fluid bed processor 400. Operation of fan 410 and heating element 415 is controlled using control panel 460.

Next, the air inlet fan 410 is turned on and up to 2,500 cubic feet per minute of ambient air is circulated from outside the drying apparatus, past the air inlet fan 410, through the heating element 415 (where heat transfer occurs), and through the grating of screen 485 within the fluid bed processor 400. After passing through the grating of screen 485, the heated air transfers its heat to the WSG. This heating and vibrating process continues until the WSG becomes Dry Spent Grain (DSG). In combination with the vibrating fluid bed 400, this circulating air fluidizes the WSG. This fluidization is necessary, because it facilitates maximal heat transfer from the hot, dry air to the WSG, thereby resulting in the removal of water/moisture down to the ideal 5% moisture content in a quicker and more energy-efficient manner.

While this fluid bed processor 400 is capable of drying the grain down to a moisture level of <1%, DSG should be removed from the fluid bed processor 400 with between 5% and 9% water content remaining. If the DSG has a moisture content lower than 5%, the DSG may burn, making the product less desirable for human consumption. Additionally, drying the grain beyond 5% is less economical and energy efficient, since doing so requires excess energy. However, it's also important that moisture levels in the DSG do not exceed 9% before being removed. Otherwise, the DSG might be difficult to mill and have shelf-life stability issues.

This entire drying process using fluid bed processor 400 is typically done in batches. Each batch takes approximately 15 to 25 minutes to complete, depending on the weight of grain added and the moisture content at the start of the drying process. However, the loading and extraction can also be accomplished in a continuous manner.

Figure 5B:
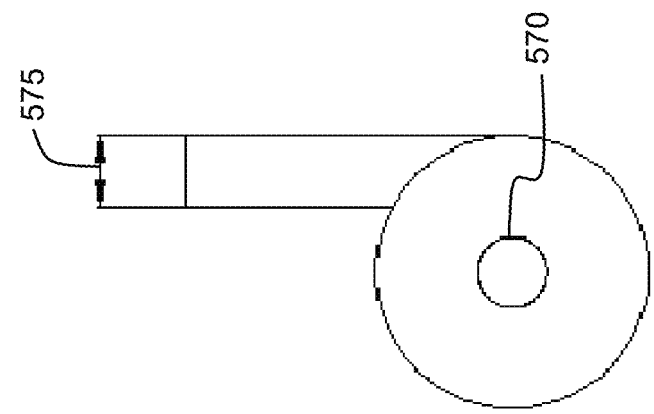
FIG. 5B is a closer view of the dust collector of FIG. 5B.

Fluid bed processor 400 includes an inlet 425 for introducing the WSG to fluid bed processor 400 from DSP 300. There are two outlets provided with fluid bed processor 400, a drying system exhaust outlet 435 and DSG outlet 440. Drying system exhaust outlet 435 will be described in more detail below with respect to FIG. 5. DSG outlet 440 is the conduit for releasing the DSG into food-safe container 465 once the thermal drying process is complete. For monitoring the progress inside fluid bed processor 400, there are two viewing ports 445 and 450 provided.

The heated air is preferably measured at the inlet 470 and at one or both outlets. Once the spent grain is effectively dried, after 12-15 minutes, the heated air at the outlet will read between 190° F. and 220° F., indicating that the moisture has been effectively removed from the WSG. The spent grain is dried in the fluid bed processor 400 until moisture levels are reduced to less than 9%, preferably 5%, leaving the DSG suitable for long-term storage.

Figure 5A:
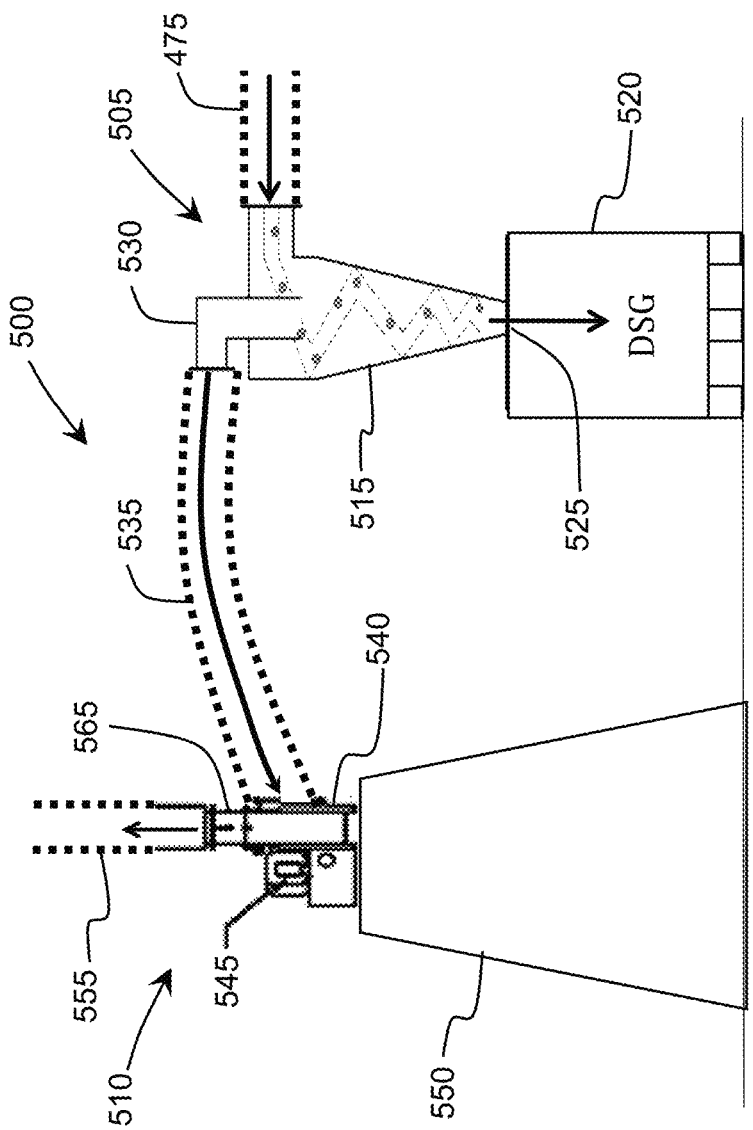
FIG. 5A is a plan view of a dust collector and a food-safe cyclonic separator apparatus.

As shown in FIG. 4, fluid bed processor 400 includes an exhaust outlet 435 connected to exhaust conduit 475. As illustrated in FIG. 5A, this exhaust conduit 475 is preferably operatively connected and in communication with a dust collecting system 500 that includes a cyclonic separator 505 and a dust collector 510. While heated air is circulated through the WSG and the vibrating fluid bed processor 400, a portion of the WSG gets caught in the air current. With the help of a single-stage dust-collector 510, this WSG-laden air is circulated through the exhaust system, and the WSG typically ends up as refuse. However, with the additional installation of a food-safe cyclonic separator 505 on the dust collector system, this partially dried grain can be collected and dried. While recycling the partially dried grain has the obvious benefit of not wasting any grain in the process of making even dryer grain, another benefit is increasing the production efficiency. Because the grain is partially dried, these batches dry even quicker. On average, adding the cyclonic separator 505 increases the average production rate (in pounds per hour of DSG) by 6-10%.

While the majority of DSG will exit the fluid bed processor 400 directly into food-safe container 465 via DSG outlet 440, some of the fluidized WSG in fluid bed processor 400 will be caught in the air flow prior to being fully dried and will exit fluid bed processor 400 through exhaust system outlet 475. As shown particularly in FIG. 1, exhaust system outlet 475 is a conduit that preferably connects fluid bed processor 400 with cyclonic separator 505. As shown in FIG. 5A, cyclonic separator 505 has a cone-shaped main body 515, with an exhaust air outlet 530 and a particle outlet 525. Once in operation, cyclonic separator 505 creates a vortex within the main body 515, and this vortex action exerts centrifugal force on the particles of WSG. Through the action of gravity, these partially dried particles of WSG travel down through the main body 515 and exit cyclonic separator through outlet 525 into food-safe holding container 520. The WSG contents of this food-safe holding container 520 can be dried completely by cycling back into the fluid bed processor 400, as shown in dashed line in FIG. 1. Alternatively, the contents of the food-safe holding container can be reintroduced at the start of the process, particularly placed in the food-safe gravity-drainage container 200 to be run again through the process from the beginning, as shown in dashed line in FIG. 1. The airflow, as well as any particles or grains of WSG not captured by the vortex action in cyclonic separator 505, is discharged from cyclonic separator 505 through exhaust outlet 530. This exhaust air, as well as any stray particles of grain, flows through exhaust conduit 535 that is connected at one end to exhaust outlet 530 and at the other end to dust collector 510.

Dust collector 510 is preferably a single stage dust collector having a main body 540, an associated exhaust fan 545, and an exhaust conduit 555 for releasing the air. One purpose of the dust collector 510 is to move air (via a suction/vacuum) at several hundred CFM in order to equalize the air flow generated by the fluid bed processor 400. The equalization will allow the spent grain to remain levitated within the housing thereby maintaining its fluidizing properties for fast drying. As shown in the simplified view of FIG. 5B, dust collector 510 has an inlet 570 for receiving air therethrough from cyclonic separator, as well as an exhaust outlet 575. As shown in FIG. 5A, exhaust outlet 565 is connected and in fluid communication with exhaust conduit 555. Dust collector 510 and exhaust fan 545 are shown being placed upon or mounted on stand 550.

Turning to FIG. 6, there is shown an isometric view of food-safe cooling container 465. After DSG emerges from the fluid bed processor 400, it is placed in a food-safe container 465 until the heat has dissipated. The grain needs to be cooled to approximately 80° F. from the starting point of approximately 212° F. Depending on ambient temperature and the minimal residual moisture still retained in the DSG, this cooling step takes about 1-2 hours.

This cooling step is important for two reasons. The first reason is that this cooling step increases the brittleness and decreases the ductility of the DSG. If the grain is still at a temperature above 80° F. when milled, the resulting outcome is a Spent Grain Flour (SGF) that is poorly sorted and has a high number of spindle-shape grain chunks. These long, narrow grain remnants decrease the palatability of the resulting flour, which decreases the quality of the resulting baked goods. The second reason that the cooling step is important is to preserve the wear on the milling mechanism. Heat is generated while milling occurs, but heat accumulation can be lessened by decreasing the heat of the input feed material, i.e. the DSG.

Milling of the Spent Grain

Following the cooling of the DSG, the DSG is loaded into a disc mill 700 as shown in FIG. 7A, and the DSG is milled into a fine flour. DSG is loaded into the hopper 710, either manually or automatically through an optional mill conduit 705. The DSG passes through hopper 710 and into disc mill assembly 720 containing multiple discs 730, 735 (shown in FIG. 7B) for grinding the DSG into SFG. Discs 730 & 735 are driven by disc mill motor 715. Once ground, the SFG is discharged from disc mill 700 through disc mill outlet 725 into a food-safe SFG container 740.

The grain-size setting for the disc mill 700 should be as small as necessary to get a fine to medium flour (with respect to coarseness—See Table 2 below). The actual milling plates 730, 735, as shown in the simplified schematic illustrated in FIG. 7B, are preferably composed of tungsten carbide (as opposed to stainless steel) in order to reduce heat accumulation. This reduction in heat accumulation decreases downtime for the operation of disc mill 700, and decreases physical wear on the equipment, allowing the mill 700 to continue operating under varying conditions. The tungsten carbide plates 730, 735 will be able to handle grain moisture levels between 5% and 9% while consistently milling the DSG into fine flour. If the grain has a higher than expected moisture content, a filter cake is formed while milling. In addition to potentially clogging the mill, this forces the motor 715 to exert more work. Once the DSG passes through the mill 700, it becomes SFG and can be used in any baking application.

TABLE 2

Percent of Spent Grain Flour Remaining in Each Screen Following A Grain-Size Sieve Test

| Size of Opening in mesh screen (mm) | % of Total Flour that Passes Through a Given Screen |
| --- | --- |
| 1.00 | 99.63% |
| 0.71 | 99.27% |
| 0.60 | 98.90% |
| 0.425 | 95.60% |
| 0.297 | 83.52% |
| 0.18 | 58.61% |
| 0.149 | 7.33% |
| 0.075 | 4.03% |

As illustrated in FIG. 7B, disc mill 700 incorporates discs 730a, 730b, and 735 for grinding the DSG into SGF. Discs 730a, 730b are stationary grinding discs with cutting surfaces (not shown). Disc 735 is a rotating disc. When DSG is loaded into disc mill 700, the DSG falls between the grinding discs 730a, 730b and rotating disc 735. The DSG is ground by the rotation of rotating disc 735 against the cutting surfaces on grinding discs 730a and 730b.

Alternative embodiments may utilize an impact mill (not shown) in place of the disc mill 700. Impact mills (also known as rock crushers or hammer mills), are used for a variety of applications including but not limited to mineral crushing, spice grinding, crushing beans, etc. The purpose of the impact mill is to reduce the DSG to a desired consistency, no matter how malleable or flexible the material is. DSG is placed into the impact mill that crushes the grain. The resulting consistency is a 70-200 U.S. Standard sieve size, an appropriate size for all forms of baking and cooking. The resulting flour is dispensed from the impact mill and stored for later use in foodstuff applications.

Figure 8A:
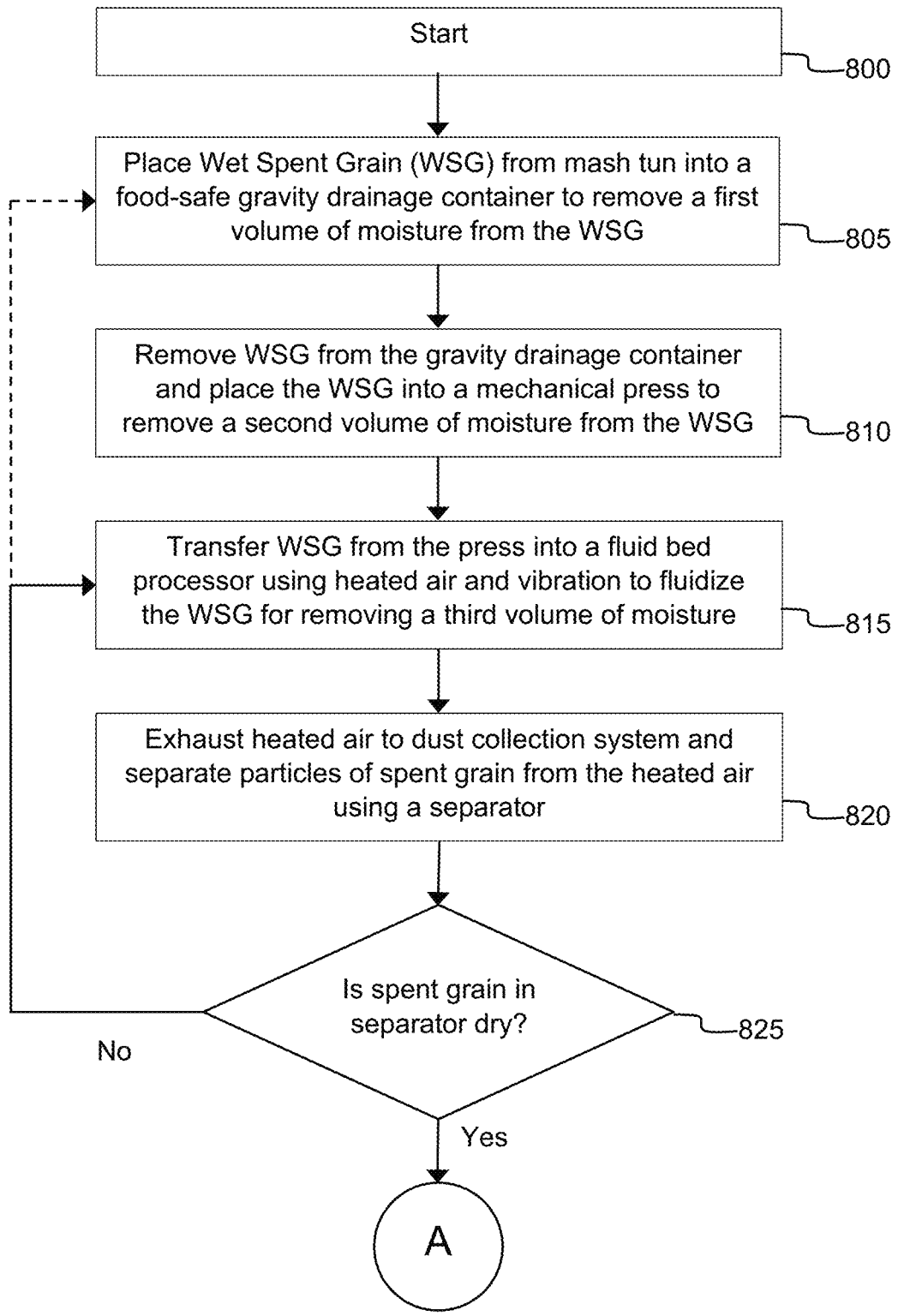
FIGS. 8A & 8B are a flowchart illustrating a method for drying wet spent grain into dry spent grain, and further milling the dry spent grain into spent grain flour.
Figure 8B:
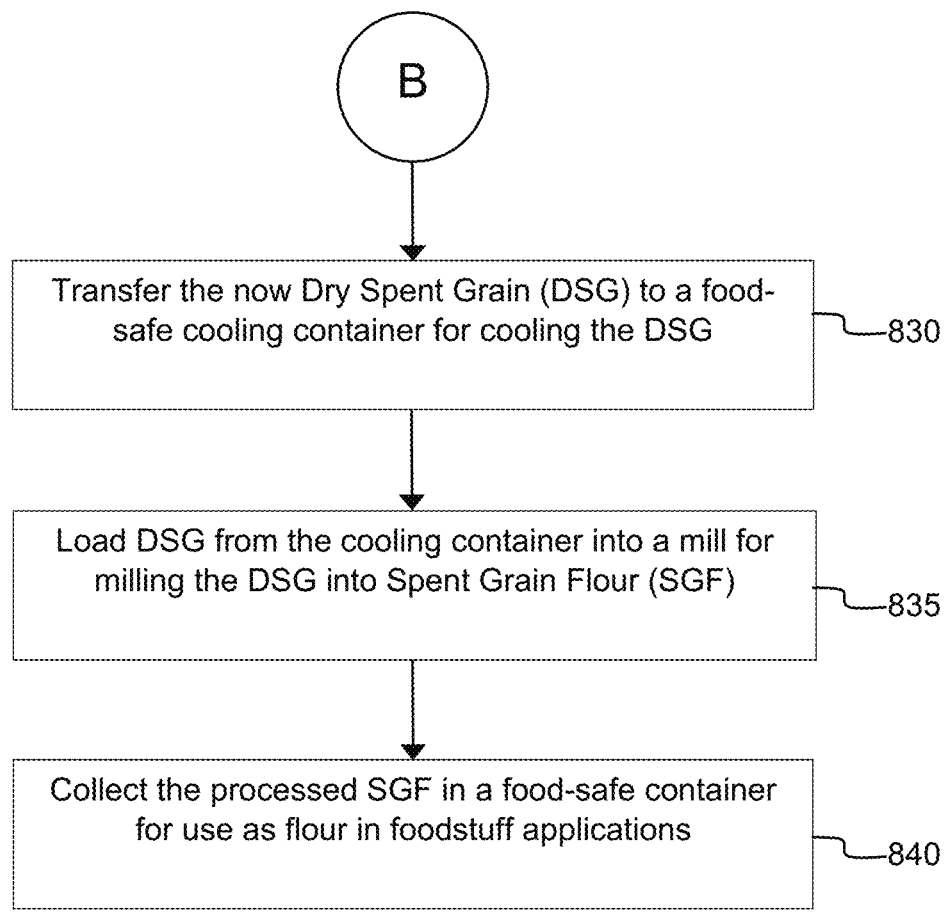

Turning now to FIG. 8, there is shown a flowchart illustrating a method for drying WSG into DSG, and then milling the DSG into SGF. The method starts at Step 800. At Step 805, the WSG is removed from the mash tun and placed into a food-safe gravity drainage container. By the action of gravity, a percentage of the moisture content of the WSG is removed, resulting in a dryer grain product.

At Step 810, the WSG is removed from the gravity drainage container, and the WSG is placed into a press for mechanical moisture removal. As previously indicated, the press is preferably a screw press, and the action of the screw press mechanically removes residual moisture in the WSG. The method continues with removal of the WSG from the press, and the WSG is then transferred to a fluid bed processor or dryer in a thermal drying action (Step 815). The fluid bed processor 400 uses both heated air and vibration that causes fluidization of the WSG particles for removing much of the remaining moisture in the WSG. Once removed from the press, the grain is considered dry spent grain (DSG) with a moisture content preferably less than 9%, and more preferably about 5%. The DSG is transferred to a food-safe cooling container 465 for a threshold time period in order to cool the heated DSG (Step 820) prior to milling the DSG.

While the WSG is being dried in fluid bed processor 400, the heated air is exhausted from fluid bed processor 400 to a dust collecting system 500 that includes a separator 505. As previously described, the separator 505 helps to remove any spent grain particles that are present in the exhausted air. Any such spent grain particles are collected into a food-safe holding container 520. If the spent grain particles in food-safe holding container 520 are sufficiently dry, i.e., 5% to 9% moisture content (Step 825), the particles may be added to the DSG in the food-safe cooling container 465. If the particles of spent grain require additional moisture to be removed, the particles of spent grain can be either run again through the fluid bed processor 400, or alternatively, the particles of spent grain may be placed in the food-safe gravity drainage container 200 to begin the process anew.

After sufficient cooling, the DSG is loaded into a mill at Step 830. The mill operates to grind the DSG particles into spent grain flour (SGF) at Step 835. When the SGF is sufficiently ground, the SGF is collected in a food-safe container at Step 840 until it is packaged or used for foodstuff applications.

Flour derived from spent grain can be used for a variety of foodstuff applications. Spent grain contains highly nutritious properties, specifically a high composition of protein and fiber, which is retains even in a flour form. It is contemplated that a number of protein rich recipes could be made with spent grain flour. In some embodiments, spent grain flour could comprise baked goods, such as, biscuits, waffles, pancakes, bread, and cookies. A baking recipe including the use of spent grain flour is illustrated below.

Example 1: Low Gluten Sandwich Spent Bread Recipe

| Ingredient | Amount |
| --- | --- |
| Spent grain (barley) flour | 4 oz |
| White or brown rice flour | 4 oz |
| Tapioca starch | 4 oz |

-continued

| Ingredient | Amount |
| --- | --- |
| Garlic salt | 2 tsp |
| Xantham gum | 1 Tbsp |
| Kosher salt | 1 tsp |
| Warm water | 500 g (by weight) |
| Sugar | 1 tsp |
| Active dry yeast | 2 Tbsp |
| Melted butter, not too hot | 60 g |
| Whole egg | 1 |
| Yolks | 2 |
| Vinegar | 2 Tbsp |

The recipe example above calls for an oven to be preheated to 375° F. and to lightly butter a 9"×11" rectangular baking pan. Heat water to lukewarm and add the sugar and yeast, whisk and set aside for 10 minutes to proof the yeast. Meanwhile, in a separate bowl, melt the butter, add the vinegar, and beat in the eggs. In a stand mixer bowl, blend all dry ingredients on a low speed for a few seconds. Next, add the proofed yeast and mixed wet ingredients. With a paddle attachment, incorporate all ingredients together, and mix on medium speed for 4 minutes to make a smooth, thick batter. Scoop the dough into the pan, and press it level using a spatula. Cover the pan with a greased plastic wrap and sit it in a warm place, and let it rise for about 30 minutes, or until it reaches the rim of the bread pan. Remove the plastic wrap and bake it in the oven for 50 minutes. Lastly, remove the bread from the oven and let it cool on a rack.

In some embodiments, spent grain flour could be used in recipes for foodstuff other than baked goods. A recipe for high protein and fiber tortillas, including the ingredient of spent grain flour is illustrated below.

Example 2: Spent Grain Flour Tortillas

| Ingredient | Amount |
| --- | --- |
| Spent grain (barley) flour | ¼ cup |
| All-purpose flour | 1¼ cup |
| Salt | ½ tsp |
| Vegetable oil | 3 Tbsp |
| Water, very hot | 2-3 Tbsp |
| Baking powder | ¾ tsp |

The recipe example above calls for all the flour, salt, and baking powder to be shifted into a large mixing bowl. Then, add oil, and mix with your fingertips to combine. Add the hot water, working the liquid into the dough until a sticky ball forms. Wrap in plastic and let it rest for at least 30 minutes. Divide the dough into 8-10 balls (for small size) or 6-8 balls for larger ones, cover them again with the damp cloth. Lightly dust a counter with flour & roll out each ball of dough into a circle or oval approximately ¼" thick. Do not roll the dough out more than once or the dough will be tough. Heat a dry griddle or heavy skillet over medium high heat for 5 minutes. Cook the flat bread for 15-20 seconds on each side or until the dough looks dry & slightly wrinkled & a few brown spots form on both surfaces. Do not overcook or they will be hard. Wrap in kitchen towel to keep warm as you cook the other breads.

The recipes above, are merely examples, and are not intended to limit the scope of the present invention. Those of skill in the art will understand that spent grain flour could be utilized in any number of foodstuff applications in a manner similar to described herein.

The figures and descriptions in this application depict specific examples to teach those skilled in the art how to make and use the best mode of the invention. These examples are not given to limit the scope of the invention, but rather to teach inventive principles. To concisely teach inventive principles, some conventional aspects of the invention have been simplified or omitted. Those skilled in the art will appreciate many of the configurations, combinations, subcombinations, and variations on these examples that fall within the scope of the invention. For example, certain features of the invention described in separate embodiments can also be implemented in combination in a single embodiment. Conversely, various features that are described in the context of a single embodiment can also be implemented in multiple embodiments—separately or in any suitable subcombination. The invention is not limited to the specific illustrative examples described herein, but by all embodiments and methods within the scope and spirit of the invention as in the current, amended, or added claims and their equivalents. In any case, all substantially equivalent systems, articles, and methods should be considered within the scope of the invention.

We claim:

1. A method for drying and milling spent grain, comprising:
   a) acquiring a quantity of spent grain from a brewer's mash tun;
   b) placing the quantity of spent grain into a food-safe gravity drainage container, the food-safe gravity drainage container being configured for removing a first volume of moisture from the spent grain by action of gravity;
   c) transferring the quantity of spent grain from the food-safe gravity drainage container into a mechanical press, the mechanical press being configured to mechanically remove a second volume of moisture from the spent grain;
   d) transferring the quantity of spent grain from the mechanical press to a thermal drying device, the thermal drying device employing heated air moving across the spent grain within the thermal drying device, the thermal drying device further employing vibration to fluidize the spent grain within the thermal drying device, wherein a combination of the heated air and vibration enables removal of a third volume of moisture from the spent grain;
   e) collecting the quantity of spent grain from the thermal drying device to a food-safe cooling container;
   f) exhausting, via a conduit associated with the thermal drying device, the heated air from the thermal drying device to a separator;
   g) separating, via the separator, particles of spent grain present in the heated air that is exhausted from the thermal drying device;
   h) exhausting, via a conduit associated with the separator, the heated air from the separator to a dust collector, wherein the dust collector is configured to move the heated air via a vacuum, wherein the movement of the heated air equalizes air flow generated by the thermal drying device;
   i) collecting, in a food-safe holding container, the particles of spent grain separated from the heated air by the separator;
   j) transferring the particles of spent grain to the thermal drying device to continue drying the particles of spent grain;
   k) collecting, in the food-safe cooling container, the particles of spent grain from the thermal drying device; and
   l) transferring the spent grain from the food-safe cooling container to a mill, wherein the mill is configured to mechanically reduce a size of individual grains in the quantity of spent grain such that the reduction in size of individual grains produces spent grain flour.

2. The method as defined in claim 1, wherein prior to milling, the spent grain has a moisture content between 5% and 9%.

3. The method as defined in claim 1, wherein the entirety of the spent grain is dried and milled into flour.

4. The method as defined in claim 1, wherein the food-safe gravity drainage container includes a screen positioned in proximity to a base of the food-safe gravity drainage container, wherein the screen has a mesh size smaller than individual particles of the spent grain such that the spent grain does not pass therethrough, the mesh size enabling moisture from the spent grain to pass therethrough by the action of gravity.

5. The method as defined in claim 1, wherein the mechanical press comprises a dewatering screw press.

6. The method as defined in claim 5, wherein the separator is a cyclonic separator.

7. The method as defined in claim 6, further comprising creating a vortex, by the cyclonic separator, wherein the vortex exerts a centrifugal force on the particles of spent grain for separating the particles of spent grain from the heated air.

8. The method as defined in claim 6, wherein the separator is in fluid communication with the thermal drying device, and the separator is in fluid communication with the dust collector such that the separator is positioned between the thermal drying device and the dust collector.

9. The method as defined in claim 1, wherein the thermal drying device comprises a circular fluid bed processor, the circular fluid bed processor including a pair of vibrators positioned on the fluid bed processor, the pair of vibrators being configured to employ vibration for fluidizing the quantity of spent grain in the fluid bed processor.

* * * * *